United States Patent [19]

Fujimoto

[11] Patent Number: 4,673,503
[45] Date of Patent: Jun. 16, 1987

[54] VARIANT LENGTH PLEATED FILTER ELEMENT

[75] Inventor: Etsuo Fujimoto, Yokohama, Japan

[73] Assignee: Tokyo Roki Co., Ltd., Kanagawa, Japan

[21] Appl. No.: 799,168

[22] Filed: Nov. 12, 1985

[30] Foreign Application Priority Data

Jul. 18, 1985 [JP] Japan .......................... 60-108811[U]
Jul. 18, 1985 [JP] Japan .......................... 60-108812[U]
Jul. 25, 1985 [JP] Japan .......................... 60-113105[U]

[51] Int. Cl.⁴ .......................................... B01D 27/06
[52] U.S. Cl. ............................. 210/493.1; 210/493.5; 210/497.01; 55/488; 55/489; 55/498; 55/510; 55/521
[58] Field of Search ............... 210/493.1, 493.3, 493.5, 210/497.01, 497.2; 55/484, 489, 510, 521, 529, 488, 498

[56] References Cited

U.S. PATENT DOCUMENTS

| | | | |
|---|---|---|---|
| 3,231,094 | 1/1966 | Wiegand ........................... | 210/493.1 |
| 3,371,790 | 3/1968 | Kudlaty et al. .................. | 210/493.1 |
| 4,154,688 | 5/1979 | Pall .................................. | 210/493.1 |
| 4,522,719 | 6/1985 | Kuwajima et al. .............. | 210/493.1 |

FOREIGN PATENT DOCUMENTS

| | | | |
|---|---|---|---|
| 549311 | 11/1957 | Canada ............................. | 210/493.1 |
| 112558 | 12/1982 | European Pat. Off. ......... | 210/493.1 |
| 140672 | 7/1978 | Japan ............................... | 210/493.1 |
| 734358 | 7/1955 | United Kingdom ............. | 210/493.1 |
| 781864 | 8/1957 | United Kingdom ............. | 210/493.1 |

Primary Examiner—Richard V. Fisher
Assistant Examiner—Wanda L. Millard
Attorney, Agent, or Firm—Barnes & Thornburg

[57] ABSTRACT

A filter element adapted to be incorporated in filter devices such as air filter, oil filter and fuel filter is disclosed which includes a pair of end plates and a filter material folded so as to form a series of pleats and disposed between the end plates to define a hollow cylinder having outer and inner circumferences. The space between the circumferences is divided into at least six areas to contain the pleats with symmetrical pattern. Each of the areas includes a group of the inner ridges, through which the pleats are connected to each other, arranged substantially along the pleat in the adjacent area to thereby vary the length of the pleats connected through the inner ridges of the group.

4 Claims, 8 Drawing Figures

VARIANT LENGTH PLEATED FILTER ELEMENT

BACKGROUND OF THE INVENTION

This invention relates to an improvement of a filter element adapted to be incorporated into filtering devices such as an air cleaner, oil filter or fuel filter used, for example, in an internal-combustion engine.

A conventional filter element for such filtering devices typically comprises a pair of end plates having central apertures and a filter material such as paper having rough surface. A long strip of the filter material is reversely folded to form a series of sections or pleats of uniform length to thereby increase the filtering surface, and the material thus folded is secured between the end plates to define a cylindrical shape having a central passage for the filtrate. Such typical filter element is ilustrated in FIG. 1. The pleats are indicated by reference numeral 1 and are connected to each other at outer ridges 2 and at inner ridges 3 which defines an outer circumference 4 having a radius D1 and an inner circumference 5 having a radius D2, respectively.

Performance of the filter element of this kind is mainly determined by total volume of the filtering surface. The filtering surface can be increased or enlarged either by increasing the dimension of each pleat 1 or by increasing the number of the pleats. The enlarged dimension of the pleat is obtained by increasing the radius D1 and/or decreasing the radius D2, but the filtering devices usually limit the size of filter element. On the other hand, by increasing arrangement density the number of the pleats per unit of voulme can be increased to the extent that the two adjacent pleats can be separated from each other sufficiently to permit the fluid to flow therebetween and to minimize the loss of capacity due to the accumulation of dust, sludge and the like.

In the conventional element as illustrated in FIG. 1, the pleats 1 are arranged generally radially and are symmetrical with respect to the center of the cylinder. Therefore, the distance A2 between the adjacent inner ridges 3 is smaller than the distance A1 between the adjacent outer ridges 2. In other words, the density of the pleats 1 thus arranged is increased toward the inner circumference 5 and reduced toward the outer circumference 4. Consequently, even if the pleats 1 are so arranged as to have a density of maximum permissible value at around the inner circumference 5, there are necessarily created extra and vain spaces at around the outer circumference 4. This limits the efficiency of the filter element of the prior art.

It is therefore an object of the present invention to provide a filter element having an improved efficiency and capacity.

Another object of the invention is to provide a filter element in which density of the pleats can be increased with maintaining intervals between the pleats sufficient to permit the fluid to flow therebetween.

A further object of the invention is to provide a filter element in which the number of the pleats can be increased to thereby enlarge the filtering surface.

SUMMARY OF THE INVENTION

According to the present invention a filter element comprises a pair of end plates arranged in parallel with each other and a filter material disposed between the end plates to form a hollow cylinder having an outer circumference and an inner circumference, the filter material being folded so as to form a plurality of pleats connected to each other through outer ridges and inner ridges. The space defined between the outer and inner circumferences are divided into at least six areas to contain the pleats with symmetrical pattern with respect to the center of the hollow cylinder. The outer ridges in each of the areas are arranged substantially at equal intervals along one of the outer circumference and a chord thereof, and each of the areas includes a group of the inner ridges arranged substantially along one of the pleats in the adjacent area to thereby vary the length of the pleats connected through the group of the inner ridges.

Preferably, the space between the circumferences is divided into eight areas.

The adjacent pleats connected through the inner ridge may be away from each other toward the outer circumference. Alternatively, the pleats in each area may be arranged substantially in parallel with each other at equal intervals.

Other objects, features and advantages of the present invention will be apparent from the following detailed description of preferred embodiments thereof when taken in conjunction with the accompanying drawings, in which:

DETAILED DESCRIPTION OF THE INVENTION

Figure 1:
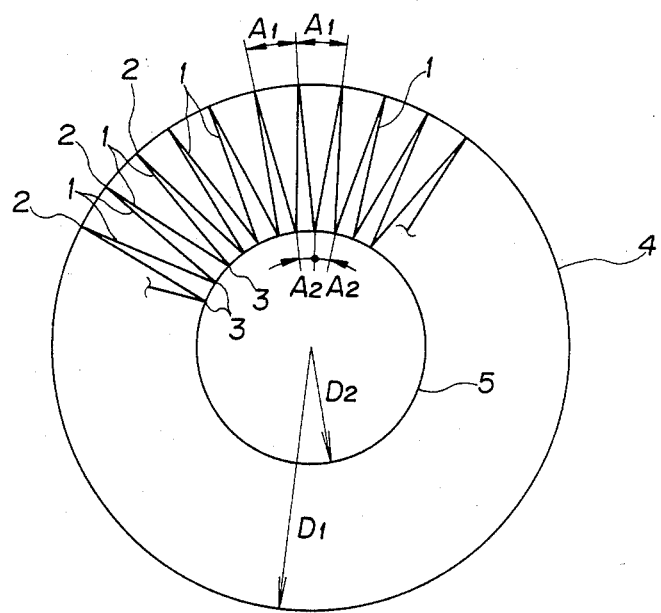
FIG. 1 is an explanatory schematic view of a conventional filter element.
Figure 2:
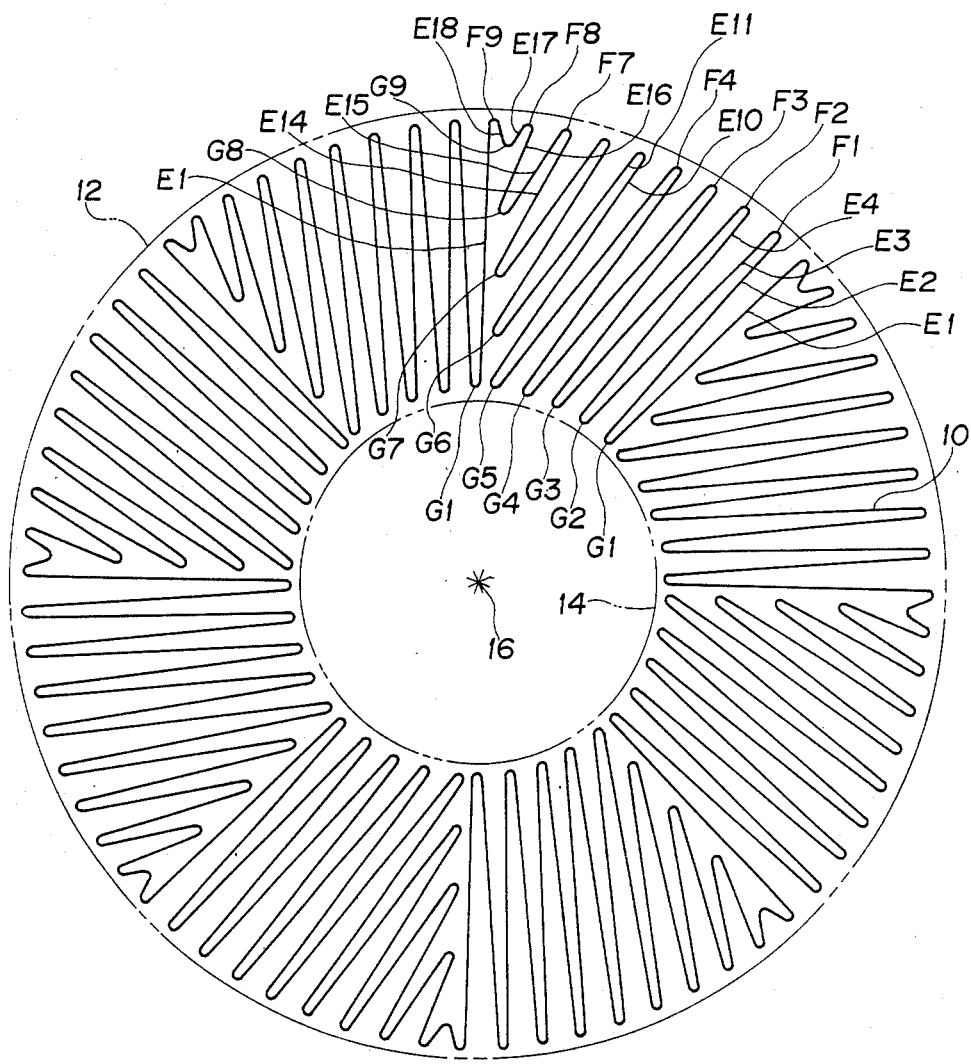
FIG. 2 is a schematic plan view illustrating a filter element according to a first embodiment of the present invention.

Referring to FIG. 2 of the drawings, a filter element according to a first embodiment of the present invention includes a long strip of filter material 10, such as filter paper, which is folded to form a series of sections or pleats connected to each other through ridge portions. The filter material 10 thus folded defines a generally hollow cylinder having an outer circumference 12 and an inner circumference 14 with a center designated by numeral 16. As in the conventional filter elements, the material 10 is designed to be retained between a pair of end plates having central apertures arranged in alignment with the hollow space within the inner circumference 14.

The characteristic feature of the present invention resides in arrangement pattern of the sections or pleats of the filter material, and in this illustrated embodiment the pleats are arranged in the following manner. That is, the space defined between the outer and inner circumferences 12 and 14 is divided into eight areas each to contain a predetermined number of the pleats with the same pattern. The pattern in one of the areas is symmetrical with that in the other areas with respect to the center 16. Each of the areas includes eighteen pleats designated by E1 to E18 which are connected to each other at outer ridges F1 to F9 and at inner ridges G1 to G9. The end pleats E18 in each area is connected through the outer ridge F9 to the first pleats E1 in the adjacent area, i.e. the left hand area when viewed from the center 16.

The outer ridges F1 to F9 are arranged at substantially same intervals along the outer circumference 12. On the other hand, among the inner ridges only those as designated by G1 to G5 are arranged along the inner circumference 14 at substantially same intervals. The inner ridge G5 is approached to the inner ridge G1 in the next area to define a substantially triangular space between the pleats E10 extending outwardly from the inner ridge G5 and the first pleats E1 in the next area. The remainder of the inner ridges, i.e. inner ridges G6 to G9 situated in the left hand side of the area are generally in alignment with each other along the first pleats E1 in the next area. Thus, the pleats E11 to E18 gradually vary their length with the shortest length at E18.

The pleats E1 to E18 comprise nine pairs each forming an outwardly opened V shape in plan view. That is, the pleats E1 and E2 joined at the inner ridge G1 are so arranged as to be away from each other toward the outer circumference 12, and this is also applied to all other pairs. With such arrangement, the pleats E1 to E18 are formed at regular intervals.

Figure 3:
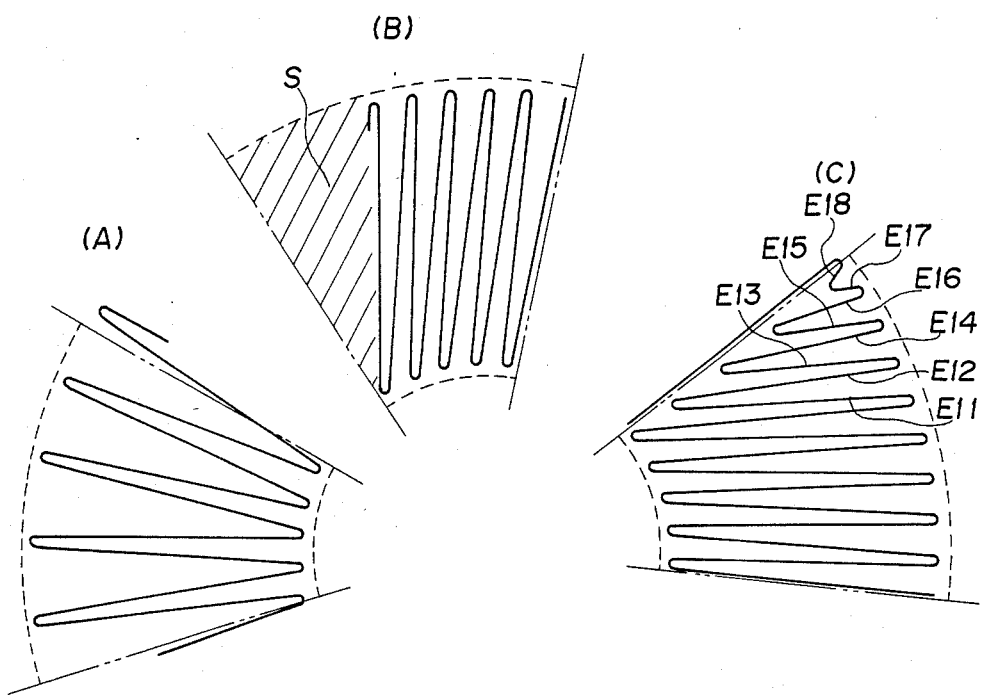
FIGS. 3 (A) to (C) are explanatory views for comparing the filter element of FIG. 1 with that in FIG. 2.

FIG. 3 (A) illustrates a pattern of the conventional filter element in an eighth ($\frac{1}{8}$) area thereof. It is now assumed for the convenience of explanation that five inner ridges are included in this area with minimum permissible spaces therebetween. The spaces between the outer ridges, however, are not reduced to minimum as hereinbefore described, and the extra space therein is more clearly illustrated in FIG. 3 (B) wherein only the outer ridges are biased to one side of the area so that these ridges may be arranged at minimum intervals. The triangular space indicated by "S" corresponds to the total of extra spaces in FIG. 3 (A). In the pattern shown in FIG. 3 (C), which is identical with the pattern in FIG. 2 of the present invention, the triangular space S in FIG. 3 (B) is filled with the pleats E11 to E18. From this, it is apparent that the filter element of the present invention may have an increased density of the pleats and an enlarged filtering surface with providing the spaces necessary for smooth flow of the filtrate.

Figure 4:
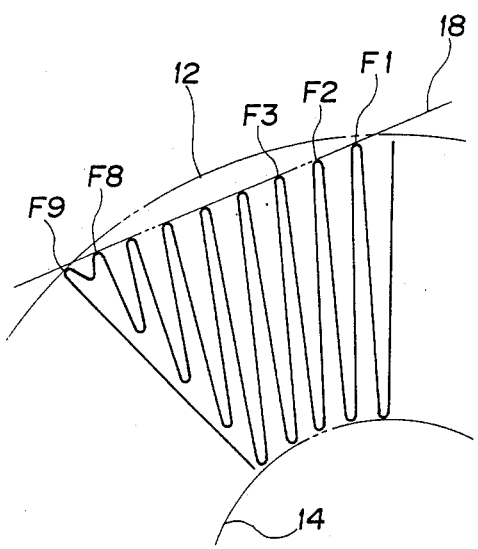
FIG. 4 is an enlarged schematic view illustrating a slightly modified form of the filter element of FIG. 2.

A slightly modified form of the filter element of FIG. 2 is illustrated in FIG. 4 wherein the outer ridges F1 to F9 are in alignment with each other along a chord 18 which intersects the outer circumference 12 substantially at points defining the area. This would facilitate the manufacture of the filter element, depending on methods to be employed for folding the filter material 10.

Figure 5:
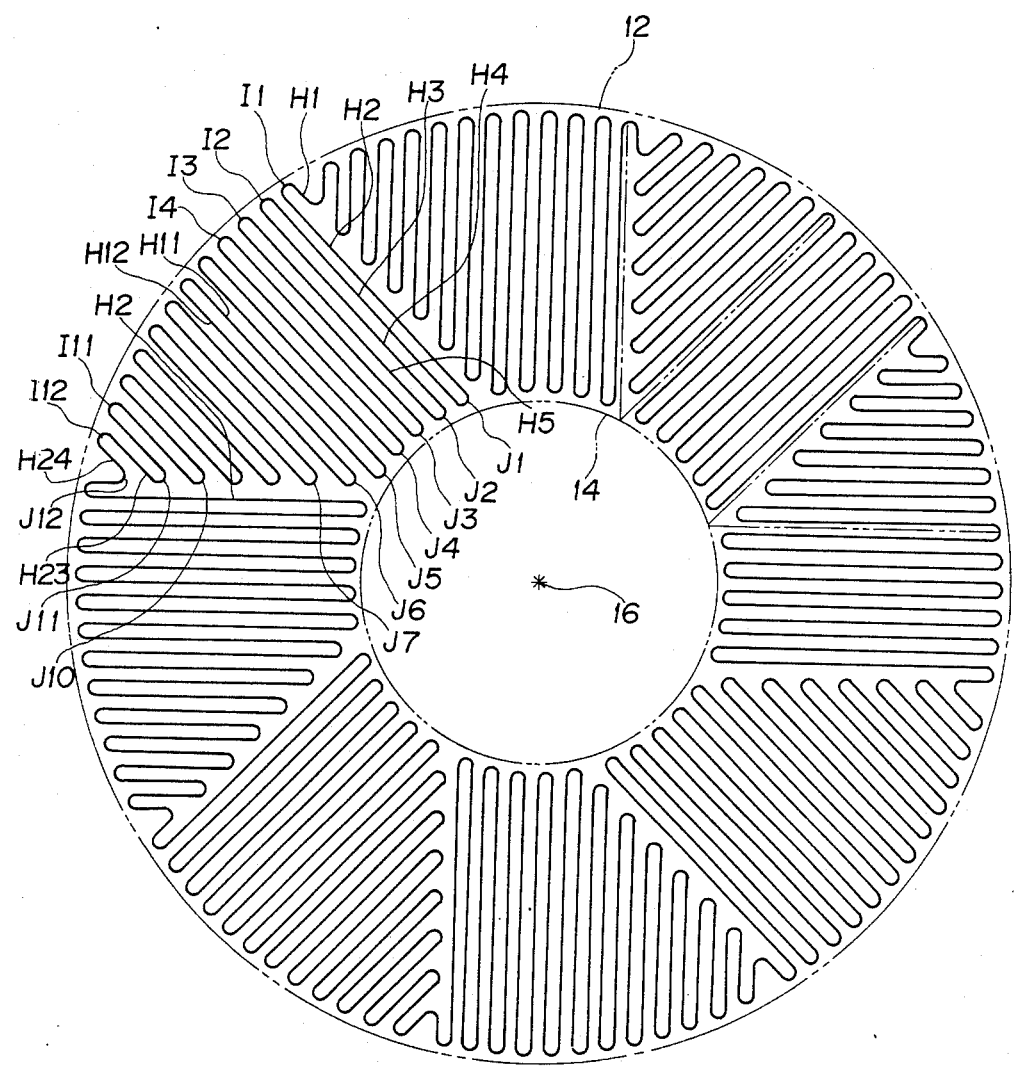
FIG. 5 is a schematic plan view showing a filter element according to a second embodiment of the present invention.

FIG. 5 shows the filter element according to the second embodiment of the invention, in which the space defined between the outer and inner circumferences 12 and 14 is divided into eight areas each to contain a predetermined number of the pleats with the same pattern. The pattern in one of the areas is symmetrical with that in the other areas with respect to the center 16. In the figure each area is illustrated to have twenty-four (24) pleats H1 to H24 which are connected to each other at outer ridges I1 to I12 and at inner ridges J1 to J12.

These outer and inner ridges are rounded sufficiently so as to permit the pleats H1 to H12 to be arranged substantially in parallel with each other at equal intervals. The area has its center in the circumferential direction at around H12 or H13, while a radius extending from the center 16 of the cylinder passes through the area at around H6 or H7.

The outer ridges I1 to I12 are arranged at regular intervals along the outer circumference 12. On the other hand, among the inner ridges only those as indicated by J1 to J5, which are situated in the right hand side of the area, are arranged at regular intervals along the inner circumference 14 to thereby practically uniform the length of the pleats H2 to H11 connected through the inner ridges J1 to J5 and the outer ridges I1 to I5. Thus, each of the pleats H2 to H11 has the length substantially equal to the radial distance between the outer and inner circumferences 12 and 14.

A triangular section, indicated by dash and dotted lines in the figure is defined between the end pleat H11 of the group having the uniform length and the first pleat H2 of the group in the next area, i.e. in the left hand area in the figure. Positioned in this triangular section are the inner ridges J6 to J12 that are generally in alignment with each other along the pleats H2 in the adjacent area. Therefore, the pleats H12 to H24 constituting another group gradually vary their length with the shortest length at H24. The pleat H1 connects the group of pleats having different length to the group of uniform length.

Figure 6:
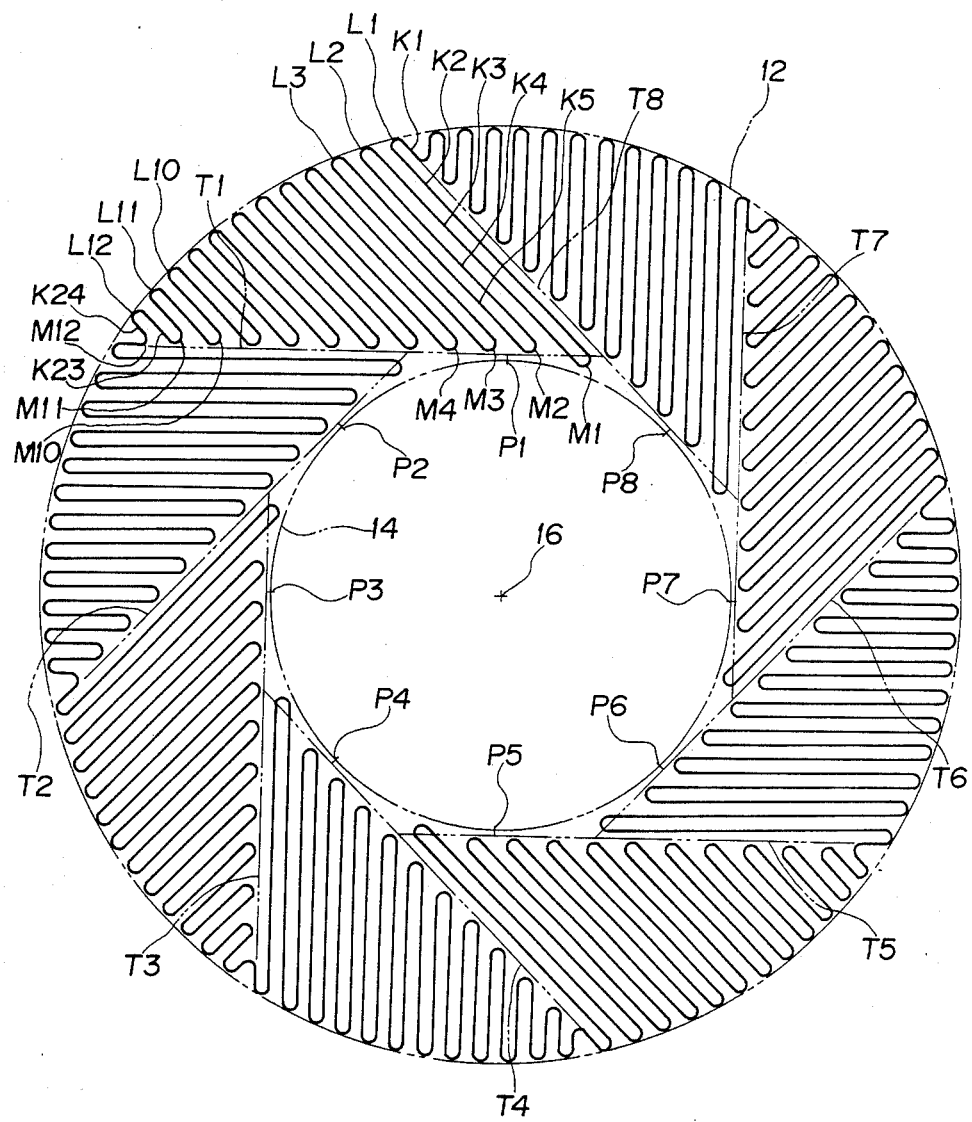
FIG. 6 is a view similar to FIG. 5 illustrating a third embodiment of the present invention.

Illustrated in FIG. 6 is the filter element according to the third embodiment of the invention, which is similar to that of FIG. 5 but is different therefrom in the following structures. That is, inner ridges M1 to M12 in each area are substantially aligned with each other along a straight line T, whereby pleats K2 to K24 gradually vary their length with the shortest length at K24. The lines T1 to T8 are tangent to the inner circumference 14 at points P1 to P8, respectively, which are formed on the circumference 14 at equal intervals. The line T of each area extends in parallel with the pleats in the next area, i.e. the left hand area in the figure so that the inner ridges M5 to M12 are also along the longest pleat K2 in the next area. The inner ridges M1 to M12 are substantially along the tangents T1 to T8, the term "substantially" being used because the first inner ridges M1 are located inside of the tangents in the illustrated example. The outer ridges L1 to L12 are arranged along the outer circumference 12 as in the second embodiment, and the pleat K1 connects the longest pleat K2 to the shortest pleat K24 in the right hand area. A radius from the center 16 of the cylinder passes through each area at around K20 or K21, i.e. at the shorter side of the area.

In any of the above embodiments, it should be noted that the space between the outer and inner circumferences may be divided into areas of desired number more than six. To divide the space into areas more than six will preclude difficulty in the manufacture. The space is preferably divided into eight areas as in the illustrated embodiments.

As it would be understood from the foregoing description, according to the invention the number of the pleats can be increased when compared with the conventional filter element, with maintaining the minimum spaces between the pleats necessary for smooth flow of the filtrate. Therefore, the filtering surface per unit of volume may be increased to maximum level.

Although the present invention has been described with reference to the preferred embodiments thereof, many modifications and alterations may be made within the spirit of the invention.

What is claimed is:

1. A filter element comprising a pair of end plates arranged in parallel with each other and a filter material disposed between said end plates to form a hollow cylinder having an outer circumference and an inner circumference, said inner and outer circumference cooperating to form an annular space, said inner and outer circumference cooperating to form an annular space, said filter material being folded so as to form a plurality of pleats connected to each other through outer ridges and inner ridges, wherein:

the space defined between said outer circumference and said inner circumference is divided into at least six areas to contain said pleats with symmetrical pattern with respect to the center of said hollow cylinder, said pleats in each said area being arranged substantially in parallel with each other at equal intervals, said outer ridges in each said area being arranged substantially at equal intervals along said outer circumference, and each said area including a first group of said inner ridges arranged substantially along one of said pleats in the adjacent area to thereby vary the length of said pleats connected through said first group of said inner ridges, and a second group of said inner ridges arranged substantially at equal intervals along said inner circumference whereby said pleats connected through said second group of said inner ridges have substantially the equal length.

2. A filter element comprising a pair of end plates arranged in parallel with each other and a filter material disposed between said end plates to form a hollow cylinder having an outer circumference and an inner circumference, said inner and outer circumference cooperating to form an annular space, filter material being folded so as to form a series of pleats connected to each other through outer ridges and inner ridges, wherein:

the space defined between said outer circumference add said inner circumference is divided into at least six areas to contain said pleats with symmetrical pattern with respect to the center of said hollow cylinder, said pleats in each said area being arranged substantially in parallel with each other at equal intervals, said outer ridges in each said area being arranged substantially at equal intervals along said outer circumference, and said inner ridges in each said area being substantially aligned with each other along a straight line extending in parallel with said pleats in the adjacent area, said straight line being tangent to said inner circumference to thereby vary the length of said pleats gradually from one side to the other side of said area.

3. A filter element comprising, a pair of end plates arranged in a spaced apart, parallel relation with each other, a filter material folded to form a plurality of pleats connected to each other through outer ridges and inner ridges, said filter material disposed between said end plates to form an annular hollow cylinder, said annular cylinder having an inner periphery and an outer periphery and being divided into at least six areas to contain said pleats, said at least six areas arranged in a symmetrical pattern with respect to the center of said annular cylinder, said pleats in each of said areas being arranged in a spaced apart, parallel relation to each other with the distance between adjacent pleats being substantially equal, said pleats in each of said areas being divided into at least first and second alternating variant length groups, the pleats in said first group having a substantially uniform length in the radial direction and having the inner ridges arranged substantially along said inner periphery, and the pleats in said second group diminishing in length toward the adjacent area and having the inner ridges substantially aligned with one of the pleats in the adjacent area.

4. A filter element comprising, a pair of end plates arranged in a spaced apart, parallel relation with each other, a filter material folded to form a plurality of pleats connected to each other through outer ridges and inner ridges, said filter material disposed between said end plates to form an annular hollow cylinder, said annular hollow cylinder having an inner periphery and an outer periphery and divided into at least six areas to contain said pleats, said at least six areas arranged in a symmetrical pattern with respect to the center of said annular cylinder, said pleats in each of said areas being arranged in a spaced apart, parallel relation to each other with the distance between adjacent pleats being substantially equal and arranged such that the outer ridges are substantially aligned with said outer periphery and the inner ridges are substantially aligned with a chord line that extends parallel to the pleats in the adjacent area and tangent to said inner periphery such that the pleats in each of said areas have diminishing lengths from one side of the area to the other side of the area.

* * * * *

UNITED STATES PATENT AND TRADEMARK OFFICE
CERTIFICATE OF CORRECTION

PATENT NO. : 4,673,503

DATED : June 16, 1987

INVENTOR(S) : Etsuo Fujimoto

It is certified that error appears in the above-identified patent and that said Letters Patent is hereby corrected as shown below:

In Col. 5, in claim 1, lines 6 and 7, delete "said inner and outer circumference cooperating to form an annular space," (second occurrence).

In claim 2, line 6, before "filter" insert --said--.

Signed and Sealed this

Third Day of November, 1987

*Attest:*

DONALD J. QUIGG

*Attesting Officer*

Commissioner of Patents and Trademarks